United States Patent
Shi et al.

(10) Patent No.: US 10,725,754 B2
(45) Date of Patent: Jul. 28, 2020

(54) METHOD OF MEMORY ESTIMATION AND CONFIGURATION OPTIMIZATION FOR DISTRIBUTED DATA PROCESSING SYSTEM

(71) Applicant: Huazhong University of Science and Technology, Wuhan, Hubei (CN)

(72) Inventors: Xuanhua Shi, Hubei (CN); Hai Jin, Hubei (CN); Zhixiang Ke, Hubei (CN); Wenchao Wu, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 114 days.

(21) Appl. No.: 16/216,155

(22) Filed: Dec. 11, 2018

(65) Prior Publication Data

US 2019/0278573 A1 Sep. 12, 2019

(30) Foreign Application Priority Data

Mar. 6, 2018 (CN) .......................... 2018 1 0184254

(51) Int. Cl.
*G06F 9/44* (2018.01)
*G06F 8/41* (2018.01)
*G06F 11/34* (2006.01)
*G06F 11/36* (2006.01)

(52) U.S. Cl.
CPC .............. *G06F 8/443* (2013.01); *G06F 8/452* (2013.01); *G06F 11/3466* (2013.01); *G06F 11/3604* (2013.01); *G06F 2201/865* (2013.01)

(58) Field of Classification Search
CPC .............................................. G06F 2212/1041
See application file for complete search history.

(56) References Cited

U.S. PATENT DOCUMENTS

| 10,645,000 | B1* | 5/2020 | Nayak ..................... H04L 45/64 |
| 2005/0039196 | A1* | 2/2005 | Sasidharan ............... G06F 8/65 |
| | | | 719/331 |
| 2007/0294766 | A1* | 12/2007 | Mir ........................ G06Q 10/06 |
| | | | 726/23 |
| 2016/0098348 | A1* | 4/2016 | Burton ................ G06F 12/0862 |
| | | | 711/137 |

* cited by examiner

*Primary Examiner* — Jae U Jeon
(74) *Attorney, Agent, or Firm* — Michael X. Ye; Morris, Manning & Martin, LLP

(57) ABSTRACT

The present invention relates to a method of memory estimation and configuration optimization for a distributed data processing system involves performing match between an application data stream and a data feature library, wherein the application data stream has received analysis and processing on conditional branches and/or loop bodies of an application code in a Java archive of the application, estimating a memory limit for at least one stage of the application based on the successful matching result, optimizing configuration parameters of the application accordingly, and acquiring static features and/or dynamic features of the application data based on running of the optimized application and performing persistent recording. Opposite to machine-learning-based memory estimation that does not ensure accuracy and fails to provide fine-grained estimation for individual stages, this method uses application analysis and existing data feature to estimate overall memory occupation more precisely and to estimate memory use of individual job stages for more fine-grained configuration optimization.

7 Claims, 2 Drawing Sheets

METHOD OF MEMORY ESTIMATION AND CONFIGURATION OPTIMIZATION FOR DISTRIBUTED DATA PROCESSING SYSTEM

FIELD

The present invention relates to distributed data process systems, and more particularly relates to a method and a system of memory estimation and configuration optimization for a distributed data process system.

DESCRIPTION OF THE RELATED ART

With the development of the Internet and the Mobile Internet, the great amount of data brings about more and more extensive applications of distributed data process systems in big data processing. Hadoop, the leading distributed processing system, employs MapReduce Algorithm, and can achieve analysis and processing on big data in a way that is impossible when a single machine is used. However, frequent reading and writing on discs required by Hadoop bring about a choke point in terms of input output (IO) performance. In view of this problem, some next-generation distributed data process systems based on memory computing, such as Spark and Flink, have been introduced and are evolving rapidly. In Spark, the basic data unit is resilient distributed dataset (RDD), and models such as structured query language (SQL), Streaming, and MapReduce are integrated in a platform to form a complete system structure. Distributed systems like Spark cache a large amount of important intermediate data in memory to speed up iterative calculation applications, so their data processing needs huge memory space.

An existing cloud platform may need to handle multiple distributed tasks that use common memory resources, and this makes reasonable memory allocation very important. Taking Spark for example, when a Spark application task is allotted insufficient memory, the data in the shuffle or cache will spill to the disc, and this can lead to a large amount of input output (IO) operations, in turn losing its advantages in memory calculation, eventually degrading the overall task performance, and even causing memory overflow. Nevertheless, when too much memory is given, redundancy and waste of memory resources can happen.

Presently, memory estimation is done using black box models by means of machine learning. First, the general data set is randomly divided into plural small data sets, which are then processed by distributed applications. The features and memory use patterns of the distributed applications that are running are analyzed. Afterward, modeling is done for train sets, and finally memory use is estimated by referring to the features of formal data sets. Such a black box model can also be used to estimate the execution time of tasks by referring to applications and features of data.

However, this known method has its defects and limitations. First, each resulting model of machine learning is specific to a certain type of applications, and relatively ineffective to other types of applications. This means different models have to be built for different applications, forming a significant limitation. Second, since black box models are based on machine learning, the estimation is inaccurate to a certain level and divergent from the actual running of memory. Besides, a distributed application often contains plural stages, and dynamic estimation of memory variation among stages is difficult to achieve using the known method.

China Patent No. CN106598644A discloses a memory optimization method for a terminal device, which involves: when a terminal device receives a request for installing an application, acquiring a package name and a version number of the application; according to the package name and the version number of the application, acquiring first memory data the application needs to occupy from a pre-configured serving end, and comparing the first memory data to a memory x value that the system set for the application; and where the first memory data is greater than a memory threshold, prompting the user that the application will occupy excessive memory, and determining whether the application is installed according to an instruction of the user. The patent method is about determining the memory data of the to-be-installed application. During installation of the application that will occupy excessive memory, the user is prompted to decide whether he/she still wants the application to be installed. However, the patent method can neither use application analysis to estimate the optimal memory for a given application, nor dynamically estimate memory variation among stages of a given application.

SUMMARY OF THE INVENTION

In view of the shortcomings of the prior art, the present invention provides a method of memory estimation and configuration optimization for a distributed data processing system. The method at least comprises: performing match between an application data stream and a data feature library, wherein the application data stream has received analysis and processing on conditional branches and/or loop bodies of an application code in a Java archive of the application, estimating a memory limit for at least one stage based on a successful result of the match, and optimizing the configuration parameters of the application, acquiring static features and/or dynamic features of the application data based on running of the optimized application and performing persistent recording.

According to a preferred mode, the method further comprises: estimating a memory limit of at least one stage again based on a feedback result of the static features and/or the dynamic features of the application data and optimizing the configuration parameters of the application.

The present invention addresses the limitations of the existing application-specific memory estimation. Since the present invention adopts a data feature acquiring strategy, the number of operators based on Spark is reduced, and data processed by each operator in the memory can form a data variation stream. This allows every variation to be regarded as a dynamic feature of the data. These dynamic features can be shared with another application submitted later, and this means the data variation in the new application is estimable. In addition, when more historical applications have been submitted for the same data, more dynamic features of the data can be acquired, so the system can adapt itself to more distributed applications, making the system more and more versatile.

According to a preferred mode, the step of performing analysis and processing on the conditional branches and/or loop bodies of the application code comprises: analyzing the loop bodies on the basis of determining whether the application code has a conditional branch, and determining whether it is proper to estimate the memory limit of at least one stage based on memory stability of the loop bodies.

According to a preferred mode, the step of performing match between the application data stream and the data feature library at least comprises: determining whether the application data stream and the data feature library have their dynamic features and/or static features matching perfectly, and if they do not match perfectly, giving up memory estimation and submitting the application Java archive for running, or if they match perfectly, estimating the memory limit of at least one stage, optimizing the configuration, and submitting the optimized application Java archive for running.

Opposite to the black box model for machine-learning-based memory estimation that does not ensure accuracy and fails to provide fine-grained estimation for individual stages, a system executing this method uses application analysis and existing data feature to estimate overall memory occupation more precisely and to estimate memory use of individual job stages for more fine-grained configuration optimization.

According to a preferred mode, the step of acquiring the static features and/or dynamic features of the application data comprises: acquiring the static features and/or dynamic features of the application data by means of rewriting a process of a Task of a job of the application that is running, and compiling the static features and/or dynamic features of the data and making persistent recording of them into the data feature library, so as to update the data feature library. The present invention captures data static and dynamic feature, and combines application analysis to accurately estimate memory limits for individual stages of a distributed application in a certain range, thereby allowing more fine-grained configuration parameter optimization and providing technical effects superior to the prior art.

According to a preferred mode, the method further comprises: determining variation of a memory of the loop bodies based on the analysis of the code of the loop bodies and the data features in the data feature library, and where the memory remains constant or decreases, docking loop-body codes having their loop conditions removed and non-loop-body codes, or where the memory increases, giving up memory estimation and submitting the application Java archive for running.

According to a preferred mode, the method further comprises: where the conditional branch does not exist in the application code, performing analysis and processing on the loop bodies of the application code in the Java archive of the application, and/or where both the conditional branches and/or loop bodies do not exist in the application code, performing match between the application data stream of the application Java archive and the data features in the data feature library.

According to a preferred mode, the method further comprises: where the conditional branch exists in the application code, automatically filling up conditions of the conditional branch and enumerating all conditional branches, so as to performing the loop bodies code analysis on the conditional branch.

According to a preferred mode, the static feature comprises the number of rows, the number of columns, the type of data of the data and/or and the size of memory it occupies. The dynamic features are data and/or data streams processed by operators of user defined functions (UDF) and having data feature variations.

According to a preferred mode, the method further comprises: where the persistent static features and/or dynamic features exist in the data feature library and the application is still running, circularly acquiring and making persistent the dynamic features of the application data, until the running of the application ends.

Compared to the prior art, the present invention is more automated, and all the processing processes are congregated at the Spark framework itself, including the memory estimation and data feature acquirement module. This eliminates the need of manual data training and estimation, as well as repeated processing and estimation for different distributed applications like machine learning requires.

The present invention further provides a system of memory estimation and configuration optimization for a distributed data processing system, wherein the system at least comprises a data feature acquiring module, a memory estimation module, and a configuration optimization module, the memory estimation module performing match between an application data stream and a data feature library, wherein the application data stream has received analysis and processing on conditional branches and/or loop bodies of an application code in a Java archive of the application, and estimating a memory limit for at least one stage based on a successful result of the match, the configuration optimization module optimizing configuration parameters of the application, the data feature acquiring module acquiring static features and/or dynamic features of the application data based on running of the optimized application and performing persistent recording.

According to a preferred mode, the memory estimation module estimates a memory limit of at least one stage again based on a feedback result of the static features and/or the dynamic features of the program data.

The disclosed system uses application analysis to estimate the optimal memory required by big data applications. The application analysis is static, and needs time costs so small that have no negative effects on the overall running performance. Besides, in the present invention, the preferred hardware is application-specific integrated chips, which can form a device powerful in function and compact in size, minimizing the space occupation of the resulting system.

According to a preferred mode, the memory estimation module analyzing the loop bodies on the basis of determining whether the application code has a conditional branch, and determining whether it is proper to estimate the memory limit of at least one stage based on memory stability of the loop bodies.

According to a preferred mode, the memory estimation module estimates memory by: determining whether the application data stream and the data feature library have their dynamic features and/or static features matching perfectly, and if they do not match perfectly, giving up memory estimation and submitting the application Java archive for running, or if they match perfectly, estimating the memory limit of at least one stage, optimizing the configuration, and submitting the optimized application Java archive for running.

According to a preferred mode, the data feature acquiring module acquires the static features and/or dynamic features of the application data by means of rewriting a process of a Task of a job of the application that is running, and compiles the static features and/or dynamic features of the data before making them persistent in the data feature library of the data feature recording module, so as to update the data feature library.

The disclosed system uses a data feature acquiring strategy, and records the acquired data features in a permanent manner so as to share them with more applications. In the present invention, the data feature recording module is continuously updated, thereby having more and more data features. When more data features are acquired, the disclosed system is more capable of adapting itself to new distributed applications and has greater versatility.

According to a preferred mode, the memory estimation module analyzes the memory of loop bodies by: determining variation of a memory of the loop bodies based on the analysis of the code of the loop bodies and the data features in the data feature library, and where the memory remains constant or decreases, docking loop-body codes having their loop conditions removed and non-loop-body codes, or where the memory increases, giving up memory estimation and submitting the application Java archive for running.

According to a preferred mode, where the conditional branch does not exist in the application code, the memory estimation module performs analysis and processing on the loop bodies of the application code in the Java archive of the application, and/or where both the conditional branches and/or loop bodies do not exist in the application code, the memory estimation module directly performs match between the application data stream of the application Java archive and the data features in the data feature library.

According to a preferred mode, where the conditional branch exists in the application code, the memory estimation module automatically fills up conditions of the conditional branch and enumerates all conditional branches, so as to performing the loop bodies code analysis on the conditional branch.

According to a preferred mode, the static feature comprises the number of rows, the number of columns, the type of the data and/or and the size of memory it occupies. The dynamic features are data and/or data streams processed by operators of user defined functions (UDF) and having data feature variations.

According to a preferred mode, where the persistent static features and/or dynamic features exist in the data feature library of the data feature recording module and the application is still running, the data feature acquiring module circularly acquires and makes persistent the dynamic features of the application data, until the running of the application ends.

In the present invention, the data feature acquiring module updates and enriches the data feature library by continuously acquiring dynamic features, so that the memory estimation module can consistently update the memory use of every stage, and precisely update configuration parameter optimization of the application. Thus, as the disclosed system is used over time, it becomes more capable of optimizing configuration parameters of applications accurately, so the optimization can be more accurate.

DETAILED DESCRIPTIONS OF THE INVENTION

Figure 1:
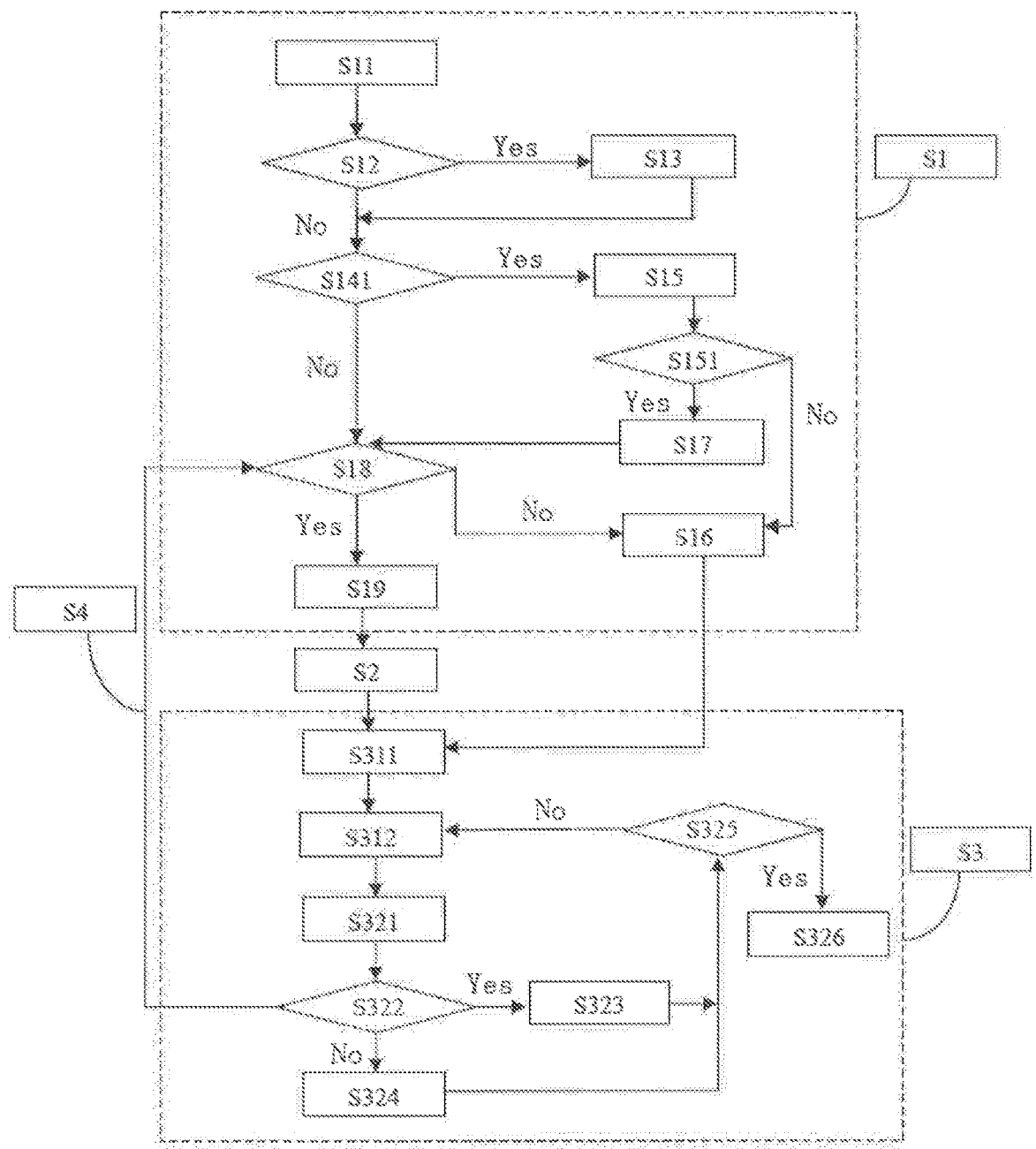
FIG. 1 is a flowchart of the method of the present invention.

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

The present embodiment provides a method of memory estimation and configuration optimization for a distributed data process system. The method at least comprises:
S1: performing a match between an application data stream and a data feature library, wherein the application data stream has received analysis and processing on conditional branches and/or loop bodies of an application code in a Java archive of the application and estimating a memory limit for at least one stage of the application based on a successful result of the match,
S2: optimizing configuration parameters of the application,
S3: acquiring static features and/or dynamic features of the application data based on running of the optimized application and performing persistent recording.

According to a preferred mode, the method further comprises:
S4: estimating a memory limit of at least one stage again based on a feedback result of the static features and/or the dynamic features of the application data and optimizing the configuration parameters of the application.

The present invention addresses the limitations of the existing application-specific memory estimation. Since the present invention adopts a data feature acquiring strategy, the number of operators based on Spark is reduced, and data processed by each operator in the memory can form a data variation stream. This allows every variation to be regarded as a dynamic feature of the data. These dynamic features can be shared with another application submitted later, and this means the data variation in the new application is estimable. In addition, when more historical applications have been submitted for the same data, more dynamic features of the data can be acquired, so the system can adapt itself to more distributed applications, making the system more and more versatile.

Preferably, the step of performing analysis and processing on the conditional branches and/or loop bodies of the application code comprises: analyzing the loop bodies on the basis of determining whether the application code has a conditional branch, and determining whether it is proper to estimate the memory limit of at least one stage based on memory stability of the loop bodies.

In the present invention, the data features comprise the number of rows, the number of columns, the type of data, and the size of memory it occupies, and further comprise transform stream data. Depending on the nature of the data, there are static features and dynamic features. The static features include the number of rows, the number of columns, the type of data and/or and the size of memory it occupies. The dynamic features are data and/or data streams processed by operators of user defined functions (UDF) and having data feature variations.

Step S1 includes the following steps and will be explained in detail with reference to FIG. 1.

S11: intercepting the application Java archive submitted to the system, and performing pretreatment code analysis on the application code. Preferably, in the present invention, it is primarily the general structure and control process of the application that gets analyzed.

In Step S12, it is to determine whether there is a conditional branch in the application code.

In Step S13, where the conditional branch exists in the application code, it is to automatically fill up conditions of the conditional branch and enumerating all conditional branches, so as to performing the loop bodies code analysis on the conditional branch.

In Step S14, where the conditional branch does not exist in the application code, it is to perform loop body analysis and processing on the application code of the application Java archive.

Preferably, in Step S141, it is to analyze whether loop body codes exist, and to process them respectively.

In Step S15, where there are loop body codes, it is to determine the memory variation of the loop bodies based on the analysis of the code of the loop bodies and the data features in the data feature library. Preferably, in Step S151, it is to determine whether the memory is consistent.

In Step S16, where the memory increases, it is to give up memory estimation and submit the application Java archive for running. Since in tasks of iterative calculation, every iterative operation represents a job, so jobs are dynamically produced during running. However, static analysis can only estimate the memory used by the first job. As there is no way to figure out the number of cycles, and the memory is inflating, it is impossible to estimate the memory use of subsequent jobs. Memory estimation is thus given up and the application Java archive is directly submitted for running.

In Step S17, where the memory remains constant or decreases, it is to dock loop-body codes by having their loop conditions removed and connecting the docked loop body codes with non-loop-body codes. Particularly, the codes are extracted from the loop bodies, and the loop conditions are removed. Docking is done with the application process outside the cycle, so as to form a new application data stream.

In Step S18, the application data stream having received application analysis is matched to the data features in the data feature library. Preferably, it is to determine whether the dynamic features and/or static features of the application data stream and of the data feature library match perfectly.

Preferably, during the application analysis, where there is no conditional branch and/or loop body in the application code, the application data stream of the application Java archive and the data features in the data feature library are matched directly. Where the application data stream does not perfectly match the data features in the data feature library, it is to give up memory estimation and to submit the application Java archive for running.

In Step S19: where the application data stream matches the data features in the data feature library perfectly, it is to estimate the memory limit for at least one stage of the application. Particularly, according to the result of the match, the basic features of the data in the memory for at least one stage are acquired. Preferably, according to the result of the match, the basic features of the data in the memory for every stage of the application are acquired. Depending on packaging in the application, the memory use of the original data for every stage is calculated according to the Java virtual machine (JVM) standard. In Spark, the memory use refers to the memory limit used in every stage. To this point, the present invention has accurately estimates the memory use of the application for at least one stage through application analysis.

The present invention is different from the black box models that machine-learning uses to perform memory estimation. Machine learning does not ensure accuracy and fails to provide fine-grained estimation for individual stages. The method of the present invention estimates overall memory occupation more precisely by analysis on conditional branches and loop bodies and existing data features, and estimates memory use of individual job stages through application analysis for more fine-grained configuration optimization.

Step S2 is now described in detail.

Preferably, after accurate memory estimation of the application for at least one stage, the configuration parameters of the application are optimized. Then the optimized application Java archive is submitted for running. Particularly, according to memory use of every stage, the total executor memory for worker nodes are configured before the job starts to run, so as to allot proper numbers of partitions for the memory use of every stage. After the configuration parameters are optimized, the optimized application is formally submitted for running.

Step S3 is now described in detail with reference to FIG. 1.

In Step S31, it is to acquire the static features and/or dynamic features of the application data by means of rewriting a process of a Task of a job of the application that is running. The present invention puts no limitation on the order where the static features and dynamic features are acquired. In other words, either the static features or the dynamic features can be acquired first. Alternatively, the static features and the dynamic features are acquired at the same time.

In Step S311, when the distributed application job is submitted for running, the process of Task is rewritten. The static features of the data, such as the number of rows, the number of columns and the number of keys of the data, are acquired as the application job is running.

In Step S312: by rewriting the process of Task, the dynamic features of the data are collected. The dynamic features refer to feature variations before and after the data are processed by an operator with a user defined function (UDF), and may be regarded as a data stream.

In Step S32, it is to compile the static features and/or dynamic features of the data and make persistent recording of them into the data feature library, so as to update the data feature library.

In Step S321, the static features and dynamic features of the acquired data are returned to the master for compilation, and are made persistent to the data feature library. Preferably, the data feature library is used to store and record data features.

In Step S322: in the process of making the data features persistent, it is to determine whether static features and/or dynamic features have existed in the data feature library.

In Step S323: where there are persistent static features and/or dynamic features in the data feature library and the application is still running, the existing data features are ignored, and instead, the dynamic features of the application data are acquired circularly, until the running of the application ends.

In Step S324, where there is no persistent static feature and/or dynamic feature in the data feature library, a new dynamic feature is added to the data feature library, so as to update the data feature library.

In Step S325, it is to determine whether the running of the application ends. When the application is still running, the system circularly acquires and makes persistent the dynamic features of the application data, until the running of the application ends. In the present invention, a new dynamic feature refers to a dynamic feature that has not existed in the data feature library.

In Step S326, where the running of the application ends, the data feature acquiring module stops acquiring.

The present invention captures data static and dynamic feature, and combines with application analysis to accurately estimate memory limits for individual stages of a distributed application in a certain range, thereby allowing more fine-grained configuration parameter optimization and providing technical effects superior to the prior art.

For example, in a Spark system platform, a big data application processes data using operators and UDFs form users. A UDF is a user defined function, and may be abstracted into an expression for convenient storage. The operators are small in quantity and their semantic meanings are easy to understand. On the other hand, there are more situations in terms of UDFs. However, the code of a big data application is composed of dataPath and controlPath. Therein, dataPath involves purely data processing and is relatively simple. This part of data is resident in the memory. Temporary objects in controlPath are recycled soon, and only take a small part of the memory. The present invention is used to estimate the part of memory for such resident objects. The memory part for resident objects is basically equal to the optimal memory of the application in the big data processing platform. When an application operation A is submitted to Spark, its dataPath (static feature) is analyzed. Then its dataPath is matched to that of a historical application B that shares the same data with the application operation A. If the features match, the memory for resident objects can be estimated, and thereby the newly submitted application operation A can have the optimal performance with the least possible memory in the platform.

Taking a benchmark application in Spark and an application for getting the smallest subgraph in PageRank for example, given that the two applications share the same data, the present invention can estimate the optimal memory of one of the applications by running the other application. This is because the two are similar in terms of dataPath and memory size occupied by resident objects, including Shuffle and cache.

Embodiment 2

The present embodiment is further improvement based on Embodiment 1, and the repeated description is omitted herein.

Figure 2:
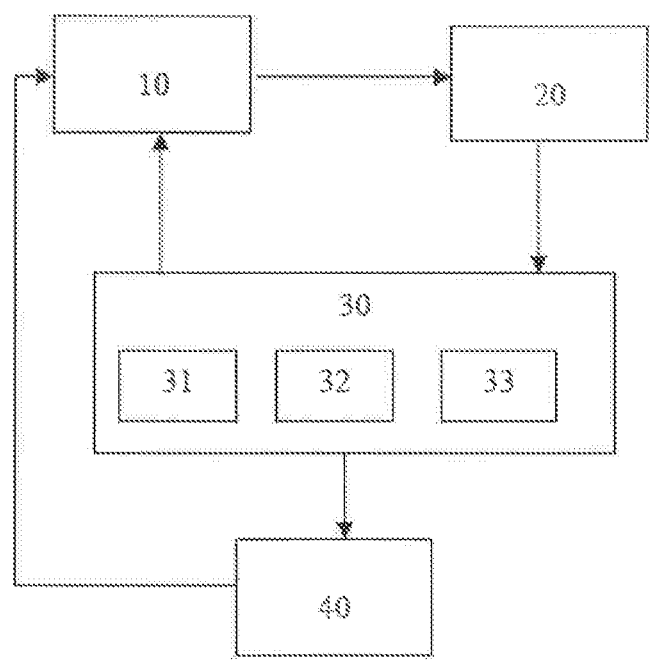
FIG. 2 is a logic structure diagram of the system of the present invention.

The present invention further provides a system of memory estimation and configuration optimization for a distributed data stream management system, as shown in FIG. 2.

The disclosed system of memory estimation and configuration optimization at least comprises a memory estimation module 10, a configuration optimization module 20, and a data feature acquiring module 30.

The memory estimation module 10 performs a match between a data stream of an application and a data feature library, wherein the data stream has received analysis and processing on conditional branches and/or loop bodies of an application code in a Java archive of the application, and estimates a memory limit for least one stage based on a successful result of the match. Preferably, the memory estimation module 10 comprises one or more of an application-specific integrated chip, a CPU, a microprocessor, a server and a cloud server for analyzing conditional branches of applications and their loop body codes. Preferably, the memory estimation module 10 is an application-specific integrated chip, favorable to minimization of the system and improvement in analysis efficiency for application codes. The memory estimation module 10 sends its estimation for memory to the configuration optimization module 20.

The configuration optimization module 20 optimizes configuration parameters of applications. Particularly, the configuration optimization module 20 according to the memory estimation made by the memory estimation module 10 modifies the configuration parameters of the application for better and more efficient running of the application. The configuration optimization module 20 at least comprises one or more of an application-specific integrated chip, a CPU, a microprocessor, a microcontroller, a server and a cloud server for optimizing configuration parameters. Preferably, the configuration optimization module 20 is an application-specific integrated chip or a microprocessor for optimizing configuration parameters of applications for better running performance of the application.

The memory estimation module 10 and the configuration optimization module 20 pre-process the application for the application Java archive, and the optimized application is submitted for running.

The data feature acquiring module 30 acquires static features and/or dynamic features of the application data based on running of the optimized application and performing persistent recording. Preferably, the data feature acquiring module 30 at least comprises one or more of an application-specific integrated chip, a CPU, a microprocessor, a microcontroller, a server and a cloud server for acquiring data features. Preferably, the data feature acquiring module 30 is a microprocessor or an application-specific integrated chip, facilitating quick data analysis and data feature acquiring. Besides, a microprocessor or application-specific integrated chip is helpful to minimize the space occupation and volume of the resulting system, making the system more mobile.

According to a preferred mode, the memory estimation module, based on the feedback from the data feature acquiring module about the static features and/or dynamic features of the application data, estimates a memory limit of at least one stage again. In other words, after the data feature acquiring module 30 acquires the data feature, it feeds the data features back to the memory estimation module 10. The memory estimation module 10, based on these data features, performs memory estimation again, thereby further optimizing the configuration parameters of the application, until the running of the application ends. Preferably, the data feature acquiring module 30 makes the acquired data feature, and particularly the dynamic features, persistent in the data feature recording module 40, and stores new dynamic features in the data feature library of the data feature recording module 40. The memory estimation module 10 may also read data features from the data feature recording module 40, and accordingly perform memory estimation for every stage of the application based on the same data features.

Preferably, the data feature recording module 40 comprises one or more of a memory, a server, and a cloud server. The memory may be a non-volatile memory or a volatile memory.

The disclosed system uses application analysis to estimate the optimal memory required by a big data application. The application analysis is static, so its time cost is small and will not have adverse impact on the overall running performance. Besides, in the present invention, the preferred hardware is application-specific integrated chips, which can form a device powerful in function and compact in size, minimizing the space occupation of the resulting system.

Preferably, the memory estimation module 10 analyzes the loop bodies on the basis of determining whether the application code has a conditional branch, and determines whether it is proper to estimate the memory limit of at least one stage based on memory stability of the loop bodies.

Preferably, the memory estimation module estimates memory by: determining whether the application data stream and the data feature library have their dynamic features and/or static features matching perfectly. If they do not match perfectly, the memory estimation module gives up memory estimation and submitting the application Java archive for running. In the event of perfect match, the memory estimation module estimates the memory limit for at least one stage and delivers it to the configuration optimization module 20. The configuration optimization module 20 optimizes the configuration parameters of the application, and submits the optimized application Java archive for running.

The data feature acquiring module 30 acquires the static features and/or dynamic features of the application data by means of rewriting a process of a Task of a job of the application that is running, and compiles the static features and/or dynamic features of the data and makes them persistent in the data feature library of the data feature recording module, so as to update the data feature library.

Preferably, the data feature acquiring module 30 at least comprises a static feature acquiring module 31 and a dynamic feature acquiring module 32. The static feature acquiring module 31 acquires static features of data. The dynamic feature acquiring module 31 acquires dynamic features of data.

The static feature acquiring module 31 rewrites the process of Task when the application job is submitted for running, and acquires static features of the data during the running. The static features may be, for example, the number of rows, the number of columns, and the numbers of keys of the data.

The dynamic feature acquiring module 32 rewrites the process of Task, and collects dynamic features of the data as the application is running. The dynamic features refer to feature variations of data before and after the data are processed by operators having user defined functions (UDFs). A dynamic feature can be regarded as a data stream. The static feature acquiring module 31 and the dynamic feature acquiring module 32 may be connected in parallel, or may alternatively be connected in series. The static feature acquiring module 31 and the dynamic feature acquiring module 32 send the static features and dynamic features respectively to the data feature recording module 40 for permanent storage.

Preferably, the data feature acquiring module 30 further comprises a compiling module 33. The compiling module 33 compiles the static features and dynamic features sent by the static feature acquiring module 31 and the dynamic feature acquiring module 32 and then delivers them to the data feature recording module 40.

Preferably, the static feature acquiring module 31 and the dynamic feature acquiring module 32 may be one or more of an application-specific integrated chip, a CPU, a microprocessor, a microcontroller, a server and a cloud server for acquiring data features. The compiling module 33 may be one or more of an application-specific integrated chip, a CPU, a microprocessor, a microcontroller, a server and a cloud server for putting the data features in order and removing duplicate data features.

The disclosed system uses a data feature acquiring strategy, and records the acquired data features in a permanent manner so as to share them with more applications. As the data feature recording module consistently updates, more and more data features are collected. When more data features are acquired, the system is more capable of adapting itself to new distributed applications, making the system more and more versatile.

Preferably, the memory estimation module 10 analyzes the memory of the loop body further by: determining variation of a memory of the loop bodies based on the analysis of the code of the loop bodies and the data features in the data feature library, and where the memory remains constant or decreases, docking loop-body codes having their loop conditions removed and non-loop-body codes, or where the memory increases, giving up memory estimation and submitting the application Java archive for running. The disclosed system determines whether to estimate memory according to memory stability, so as to maximize estimation efficiency and reduce ineffective memory estimation works.

Preferably, where the conditional branch does not exist in the application code, the memory estimation module 10 performing analysis and processing on the loop bodies of the application code in the Java archive of the application, and/or where both the conditional branches and/or loop bodies do not exist in the application code, the memory estimation module 10 directly performing match between the application data stream of the application Java archive and the data features in the data feature library.

Preferably, where the conditional branch exists in the application code, the memory estimation module 10 automatically fills up conditions of the conditional branch and enumerates all conditional branches, so as to perform the loop bodies code analysis on the conditional branch. By filling conditional branches before code analysis on the loop bodies is performed, missing of loop body codes can be effectively avoided, and accurate analysis of the subsequent loop bodies can be ensured.

Preferably, the static features comprise the number of rows, the number of columns, the type of data of the data and/or the size of memory it occupies. The dynamic features are data and/or data streams processed by operators of user defined functions (UDF) and having data feature variations.

Preferably, where there are persistent static features and/or dynamic features in the data feature library of the data feature recording module, and the application is still running, the data feature acquiring module 30 circularly acquires the dynamic features of the application data and makes them persistent, until the running of the application ends In the present invention, the data feature acquiring module updates and enriches the data feature library by consistently acquiring dynamic features, so that the memory estimation module can continuously update memory use for every stage and precisely optimize updating of the configuration parameters of the application. Thus, as the disclosed system is used over time, it becomes more capable of optimizing configuration parameters of applications accurately, so the optimization can be more accurate.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A method of memory estimation and configuration optimization for a distributed data processing system, wherein the method comprises the steps of:
performing a match between an application data stream and a data feature library, wherein the application data stream has received analysis and processing on conditional branches and loop bodies of an application code in a Java archive of the application, wherein the step of performing a match between the application data stream and the data feature library further comprises:
determining whether the dynamic features and static features of the application data stream and the data feature library match; and
if the dynamic features and static features of the application data stream and the data feature library do not match, stopping memory estimation and submitting the application Java archive for running, or
if the dynamic features and static features of the application data stream and the data feature library match: estimating the memory limit of at least one stage of the application;
optimizing the configuration; and
submitting the optimized application Java archive for running;
estimating a memory limit at least one stage of the application based on a successful result of the match:
optimizing configuration parameters of the application based on the estimated memory limit;
acquiring static features and dynamic features of the application data based on running of the optimized application and performing persistent recording;
estimating a memory limit of the at least one stage of the application again based on a feedback result of the static features and the dynamic features of the application data; and
optimizing the configuration parameters the application.

2. The method of claim 1, wherein the step of performing analysis and processing on the conditional branches and loop bodies of the application code further comprises:
analyzing the loop bodies to determine whether the application code has a conditional branch; and
determining whether the estimated memory limit of the at least one stage of the application can be estimated based on memory stability of the loop bodies.

3. The method of claim 2, wherein the step of acquiring the static features and dynamic features of the application data further comprises:
acquiring the static features and dynamic features of the application data by rewriting a process of a task of a job of the application that is running; compiling the static features and dynamic features of the application data; and updating the data feature library by making persistent recording of the compiled static features and dynamic features in the data feature library.

4. The method of claim 1, further comprising:
determining a variation of a memory of the loop bodies based on the analysis of the code of the loop bodies and the data features in the data feature library; and where the memory remains constant or decreases:
docking the loop-body codes by removing their loop conditions; and connecting the docked loop-body codes to non-loop-body codes, and where the memory increases;
stopping memory estimation; and
submitting the application Java archive for running.

5. The method of claim 4, further comprising:
where the conditional branch does not exist in the application code, performing analysis arid processing on the loop bodies of the application code in the Java archive of the application; and
where both the conditional branches and loop bodies do not exist in the application code, directly performing a match between the application data stream of the application Java archive and the data features in the data feature library.

6. The method of claim 5, further comprising:
where the conditional branch does exist in the application code, automatically filling up conditions of the conditional branch and enumerating all conditional branches, so as to perform the loop bodies code analysis on the conditional branch.

7. A hardware system of memory estimation and configuration optimization for a distributed data stream management system, wherein the system comprises a data feature acquiring module, a memory estimation module, and a configuration optimization module, and wherein:
the memory estimation module is configured to:
perform a match between a data stream of an application and a data feature library, wherein the data stream has received analysis and processing on conditional branches and loop bodies of an application code in a Java archive of the applicator, wherein the step of performing a match between the application data stream and the data feature library further comprises:
determining whether the dynamic features and static features of the application data stream and the data feature library match; and
if the dynamic features and static features of the application data stream and the data feature library do not match, stopping memory estimation and submitting the application Java archive for running, or
if the dynamic features and static features of the application data stream and the data feature library match: estimating the memory limit of at least one stage of the application;
optimizing the configuration; and
submitting the optimized application Java archive for running;
and
estimate a memory limit for least one stage of the application based on a successful result of the match:
the configuration optimization module is configured to optimize configuration parameters of the application:
the data feature acquiring module is configured to:
acquire static features and dynamic features of the application data based on running of the optimized application; and perform persistent recording; and
the memory estimation module is configured to:
estimate a memory limit of at least one stage of the application again based on a feedback result of the static features and the dynamic features of the program data: and
optimize the configuration parameters of the application.

* * * * *